United States Patent
Kitani

(10) Patent No.: US 7,301,572 B2
(45) Date of Patent: Nov. 27, 2007

(54) PIXEL CORRECTION PROCESSING APPARATUS, IMAGE PROCESSING APPARATUS, PIXEL CORRECTION PROCESSING METHOD, PROGRAM, AND STORAGE MEDIUM

(75) Inventor: Kazunari Kitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 10/384,332

(22) Filed: Mar. 6, 2003

(65) Prior Publication Data
US 2003/0169352 A1 Sep. 11, 2003

(30) Foreign Application Priority Data
Mar. 8, 2002 (JP) .............. 2002-064087

(51) Int. Cl.
H04N 9/64 (2006.01)
H04N 5/217 (2006.01)
(52) U.S. Cl. ....................... 348/247; 348/246
(58) Field of Classification Search ........... 348/246, 348/247, 241, 222.1, 243; 382/275, 274; 250/208.1
See application file for complete search history.

(56) References Cited

U.S. PATENT DOCUMENTS 5,416,516 A * 5/1995 Kameyama et al. ......... 348/246
6,683,643 B1 * 1/2004 Takayama et al. .......... 348/247
6,819,359 B1 * 11/2004 Oda ............................ 348/247
6,970,193 B1 * 11/2005 Kidono et al. .............. 348/245
7,133,072 B2 * 11/2006 Harada ....................... 348/243
2002/0015111 A1 * 2/2002 Harada ....................... 348/642

FOREIGN PATENT DOCUMENTS

| JP | 11-112879 | 4/1999 |
|---|---|---|
| JP | 11-239298 | 8/1999 |
| JP | 2000-101925 | 4/2000 |
| JP | 2000-224287 | 8/2000 |
| JP | 2000224487 A * | 8/2000 |
| JP | 2001028713 A * | 1/2001 |
| JP | 2001-245200 | 9/2001 |
| JP | 2003-046871 | 2/2003 |

* cited by examiner

Primary Examiner—Ngoc-Yen Vu
Assistant Examiner—Gregory V Madden
(74) Attorney, Agent, or Firm—Morgan & Finnegan LLP

(57) ABSTRACT

This invention has as its object to prevent degradation of the image quality caused by insufficient or excessive correction of a defective pixel, and realize high-speed, high-precision correction processing for a defective pixel. To achieve this object, an apparatus which performs correction for a pixel of an image sensing element formed from a plurality of pixels includes: (A) a memory unit which stores a plurality of correction data that have pieces of defective pixel address information and are used to correct outputs from defective pixels of the image sensing element; and (B) a correction processing unit which selects correction data for use from the plurality of correction data in accordance with a predetermined condition by a predetermined selection method including different types of selection standards, and performs defective pixel correction processing for an output from the image sensing element by using the selected correction data.

14 Claims, 10 Drawing Sheets

FIG. 7A

|  | t ≤ T1 | T1 < t ≤ T2 | t > T2 |
|---|---|---|---|
| ISO100 | data1 | data2 | data4 + data5 |
| ISO200 | data2 | data3 | |
| ISO400 | data3 | data4 | |

FIG. 7B

| data1 | 100 mV OR HIGHER |
|---|---|
| data2 | 50 mV OR HIGHER |
| data3 | 25 mV OR HIGHER |
| data4 | HIGH-LEVEL n PIXELS |
| data5 | HIGH-LEVEL (n+1)TH PIXEL TO HIGH-LEVEL (2*n)TH PIXEL |

US 7,301,572 B2

PIXEL CORRECTION PROCESSING APPARATUS, IMAGE PROCESSING APPARATUS, PIXEL CORRECTION PROCESSING METHOD, PROGRAM, AND STORAGE MEDIUM

FIELD OF THE INVENTION

The present invention relates to a pixel correction processing apparatus which performs correction to the pixel of an image sensing element, an image processing apparatus which has an image sensing element to sense, record, and play back still and moving images, a pixel correction processing method, a program, and a storage medium.

BACKGROUND OF THE INVENTION

Image processing apparatuses such as an electronic camera which uses a memory card having a solid-state memory element as a recording medium, and records and plays back still and moving images sensed by a solid-state image sensing element such as a CCD or CMOS have commercially been available.

To sense an image by using a solid-state image sensing element (to be referred to as an image sensing element hereinafter) such as a CCD or CMOS, the image processing apparatus can execute dark noise correction processing by calculation processing using dark image data read out after charge accumulation similar to actual photographing while the image sensing element is not exposed, and actual photographing image data read out after charge accumulation while the image sensing element is exposed. A high-quality image can be attained by correcting the sensed image data for image quality degradation caused by dark current noise generated by the image sensing element, a defective pixel due to a slight scratch unique to the image sensing element, or the like. Image quality degradation can be further reduced by correcting a point scratch by interpolation processing using image data of pixels adjacent to a scratched pixel (defective pixel).

In the following explanation, the phrase "scratched pixel (defective pixel)" means a pixel whose output signal is not normal. In other words, "scratched pixel (defective pixel)" includes a pixel whose output signal is too large because of an abnormal dark current noise signal (white scratched pixel) and a pixel which cannot output a signal (black scratched pixel).

As a conventional method of correcting such scratched pixels, the sensor output is evaluated for a standard charge accumulation time under predetermined conditions in shipping a sensor (image sensing element) from the factory. A scratched pixel is determined based on the evaluation result. The type of scratched pixel (black or white scratched pixel, or the like), the address of the scratched pixel, and the scratch level data are acquired. The scratched pixel is corrected using these data. These data contain the type of scratch, position data (x,y) of the scratched pixel, and the level.

The output level of a scratched pixel, particularly a white scratched pixel (white point pixel) is known to greatly change depending on the charge accumulation time of the image sensing element in photographing. Even a pixel which is not defective in general photographing for a short time (short seconds) abruptly increases its scratched pixel level in photographing for a longer time (long seconds), adversely affecting the image quality. Especially when the above-described dark noise correction processing is not executed, no small scratch is corrected, remarkably degrading the image quality by the defective pixel in long-sec photographing.

The prior art suffers the following problem. A scratched pixel is determined in accordance with the scratched pixel level for long seconds, and correction processing is performed for all pixels. Correction processing is also performed for a pixel which does not require correction processing in short-sec photographing, and excessive correction may degrade the image quality.

To solve this problem, for example, Japanese Patent Laid-Open No. 2001-28713 proposes a technique of sensing a dark image prior to photographing operation, extracting a white scratched pixel from the image, and performing correction processing for only the extracted white scratched pixel. However, the correction processing time cannot be ignored particularly upon an abrupt increase in the number of scratched pixels in long-sec photographing, and greatly influences the release time lag and photographing frame interval. This technique is not a practical solution.

A larger number of scratched pixels to be corrected occupy the memory of the image processing apparatus because pieces of address information of scratched pixels to be corrected are stored. For example, in Japanese Patent Laid-Open No. 11-112879, a dark image is photographed prior to photographing operation, and when defective pixels exceeding the memory capacity are generated in extracting white scratched pixels from the image, the image sensing element is powered off to prevent any abnormal image. At this time, even if the user wants to take a picture, he/she cannot take the picture against his/her will.

SUMMARY OF THE INVENTION

The present invention has been made in consideration of the above situation, and has as its object to prevent degradation of the image quality caused by insufficient or excessive correction of a defective pixel, and realize high-speed, high-precision correction processing for a defective pixel.

To achieve the above object, according to the first aspect, the present invention has the following arrangement.

That is, an apparatus which performs correction for a pixel of an image sensing element formed from a plurality of pixels comprises:

(A) a memory unit which stores a plurality of correction data that have pieces of defective pixel address information and are used to correct outputs from defective pixels of the image sensing element; and (B) a correction processing unit which selects correction data for use from the plurality of correction data in accordance with a predetermined condition by a predetermined selection method including different types of selection standards, and performs defective pixel correction processing for an output from the image sensing element by using the selected correction data.

According to the second aspect, the present invention has the following processing.

That is, a pixel correction processing method of performing correction for a pixel of an image sensing element formed from a plurality of pixels comprises:

selecting correction data for use in accordance with a predetermined condition by a predetermined selection method including different types of selection standards, from a plurality of correction data which have pieces of defective pixel address information and are used to correct outputs from defective pixels of the image sensing element, and performing defective pixel correction processing for an output from the image sensing element by using the selected correction data.

According to the third aspect, the present invention has the following steps.

That is, a pixel correction processing computer program of performing correction for a pixel of an image sensing element formed from a plurality of pixels comprises:

(A) a step of selecting correction data for use in accordance with a predetermined condition by a predetermined selection method including different types of selection standards, from a plurality of correction data which have pieces of defective pixel address information and are used to correct outputs from defective pixels of the image sensing element; and (B) a step of performing defective pixel correction processing for an output from the image sensing element by using the selected correction data.

According to the fourth aspect, the present invention has the following arrangement.

That is, a storage medium which stores the above-described computer program is provided.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 7A and 7B are tables showing a scratch correction data selection method and its contents used for scratch correction processing in the image processing apparatus according to the embodiment, in which FIG. 7A is a table showing the correspondence between the ISO sensitivity, the charge accumulation time, and data, and FIG. 7B is a table showing the correspondence between data and the determination level;

DETAILED DESCRIPTION OF THE PREFERRED EMBODIMENTS

A preferred embodiment of the present invention will be described in detail below in accordance with the accompanying drawings.

Figure 1:
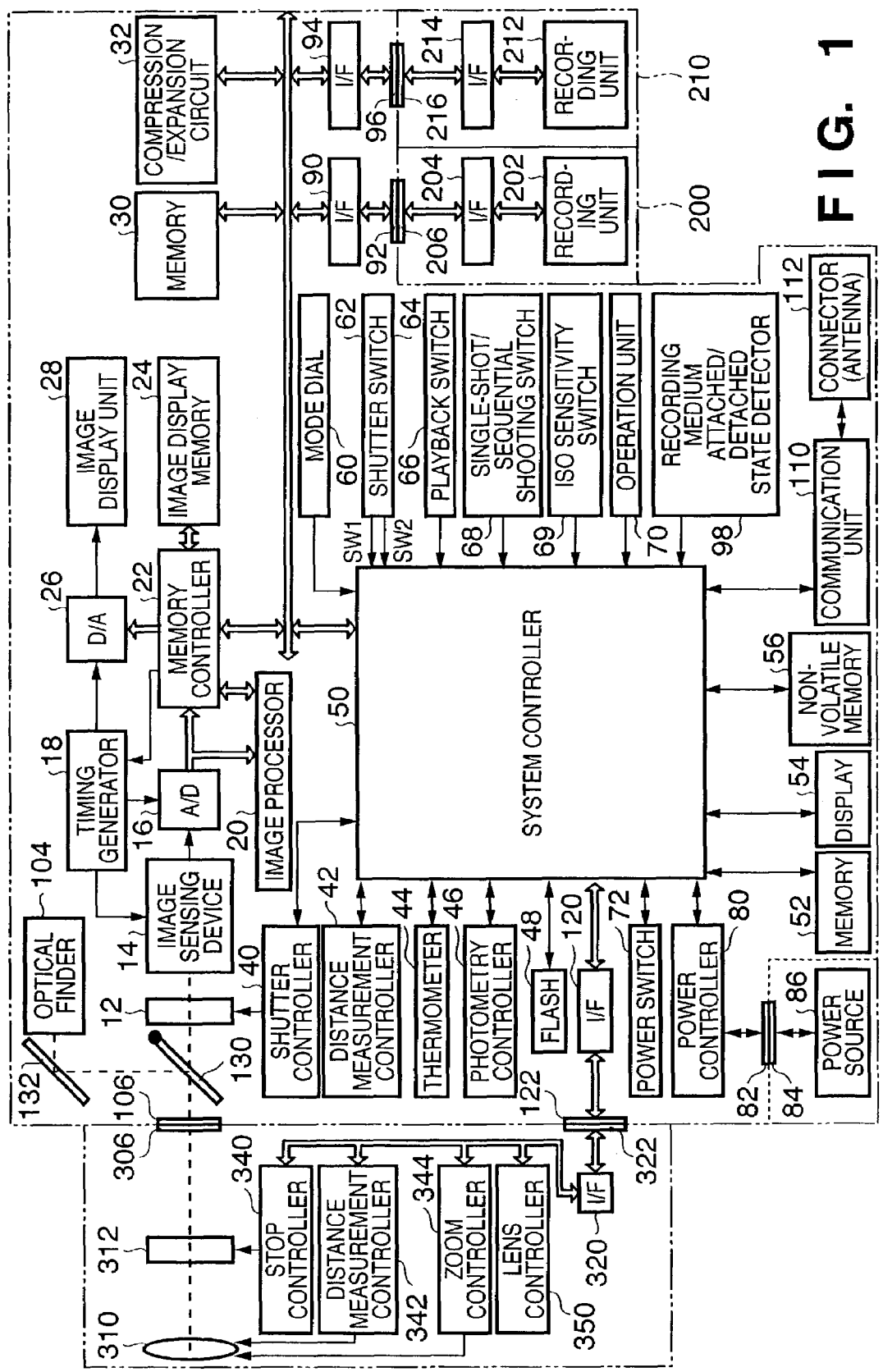
FIG. 1 is a block diagram showing the arrangement of an image processing apparatus according to an embodiment of the present invention.

FIG. 1 is a block diagram showing the arrangement of an image processing apparatus according to an embodiment of the present invention. The image processing apparatus comprises an image processing apparatus (main body) 100, recording media 200 and 210 detachably mounted in the image processing apparatus main body, and a lens unit 300 detachably mounted on the image processing apparatus main body.

The arrangement of the image processing apparatus will be described in detail. A shutter 12 controls the exposure amount to an image sensing element 14. The image sensing element 14 converts an optical image of an object into an electrical signal. In a single-lens reflex camera, a beam incident on a lens 310 of the lens unit 300 is guided via a stop 312, a lens mount 306, and a lens mount 106, a mirror 130, and the shutter 12 of the image processing apparatus 100, forming an image as an optical image on the image sensing element 14. An A/D converter 16 converts an analog signal output from the image sensing element 14 into a digital signal. A timing generator 18 supplies a clock signal and control signal to the image sensing element 14, the A/D converter 16, and a D/A converter 26 under the control of a memory controller 22 and system controller 50.

An image processor 20 performs predetermined pixel interpolation processing and color conversion processing on data from the A/D converter 16 or data from the memory controller 22. If necessary, the image processor 20 performs predetermined calculation processing using sensed image data, and the system controller 50 performs TTL (Through-The-Lens) AF (Auto Focus) processing, AE (Auto Exposure) processing, and EF (pre-flash) processing with respect to a shutter control means 40 and distance measurement control means 42 on the basis of the result of calculations. Further, the image processor 20 performs predetermined calculation processing using sensed image data, and performs TTL AWB (Auto White Balance) processing on the basis of the result of calculations.

In this embodiment, the image processing apparatus comprises the dedicated distance measurement means 42 and a dedicated photometry means 46. It is also possible to perform AF (Auto Focus) processing, AE (Auto Exposure) processing, and EF (pre-flash) processing by using the distance measurement means 42 and photometry means 46, and not to perform AF (Auto Focus) processing, AE (Auto Exposure) processing, and EF (pre-flash) processing by using the image processor 20. It is also possible to perform AF (Auto Focus) processing, AE (Auto Exposure) processing, and EF (pre-flash) processing by using the distance measurement means 42 and photometry means 46, and to perform AF (Auto Focus) processing, AE (Auto Exposure) processing, and EF (pre-flash) processing by using the image processor 20.

The memory controller 22 controls the A/D converter 16, the timing generator 18, the image processor 20, an image display memory 24, the D/A converter 26, a memory 30, and a compression/expansion circuit 32. Data from the A/D converter 16 is written into the image display memory 24 or memory 30 via the image processor 20 and memory controller 22, or directly via the memory controller 22. The image display memory 24 stores display image data. The D/A converter 26 converts a digital signal output from the memory controller 22 into an analog signal. An image display unit 28 comprises a TFT LCD or the like. Display image data written in the image display memory 24 is displayed on the image display unit 28 via the D/A converter 26. An electronic finder function can be realized by sequentially displaying sensed image data on the image display unit 28. Further, the image display unit 28 arbitrarily turns on/off its display in accordance with an instruction from the system controller 50. If the display is turned off, the electric consumption of the image processing apparatus 100 can be greatly reduced.

The memory 30, used for storing photographed still and moving images, has a sufficient storage capacity for storing a predetermined number of still images and a moving image for a predetermined period. In sequential shooting to sequentially shoot a plurality of still images or in panoramic photographing, a large number of images can be written into the memory 30 at a high speed. The memory 30 may be used as a work area for the system controller 50. The compression/expansion circuit 32 compresses or expands image data by adaptive discrete cosine transformation (ADCT) or the like. The compression/expansion circuit 32 reads out an image stored in the memory 30, performs compression or expansion processing on the read image, and writes the processed data into the memory 30.

Based on photometry information from the photometry means 46, the shutter control means 40 controls the shutter 12 in association with a stop control means 340 which controls the stop 312. The distance measurement means 42 performs AF (Auto Focus) processing. A beam incident on the lens 310 of the lens unit 300 is guided to enter the distance measurement means 42 via the stop 312, the lens mount 306, and the lens mount 106, mirror 130, and distance measurement sub-mirror (not shown) of the image processing apparatus 100 in a single-lens reflex camera, thereby measuring the focus state of an image formed as an optical image. A thermometer 44 can detect the temperature of the image sensing environment. When the thermometer 44 is incorporated in the image sensing element 14, the dark current of the image sensing element 14 can be more accurately estimated.

The photometry means 46 performs AE (Auto Exposure) processing. A beam incident on the lens 310 of the lens unit 300 is guided to enter the photometry means 46 via the stop 312, the lens mount 306, and the lens mount 106, the mirror 130, a mirror 132, and a photometry lens (not shown) of the image processing apparatus 100 in a single-lens reflex camera, thereby measuring the exposure state of an image formed as an optical image. The photometry means 46 has an EF (pre-flash) processing function in association with a flash 48. The flash 48 has an AF auxiliary light projection function and flash adjusting function.

The system controller 50 can also perform exposure control and AF (Auto Focus) control by the video TTL method of controlling the shutter control means 40, the stop control means 340, and a distance measurement control means 342, on the basis of the result of calculations by the image processor 20 for image data sensed by the image sensing element 14. AF (Auto Focus) control may be performed using both the result of measurements by the distance measurement means 42 and the result of calculations by the image processor 20 for image data sensed by the image sensing element 14. Exposure control may be done using both the result of measurements by the photometry means 46 and the result of calculations by the image processor 20 for image data sensed by the image sensing element 14.

The system controller 50 controls the overall image processing apparatus 100, and executes processing of each flow chart to be described later on the basis of a program stored in a memory 52. The memory 52 stores constants, variables, programs, and the like for operating the system controller 50. A display unit 54 comprises a liquid crystal display device and loudspeaker which display and output operating statuses, messages, and the like by using characters, images, sound, and the like in accordance with execution of a program by the system controller 50. One or a plurality of display units 54 are arranged at easy-to-see positions near the operation unit of the image processing apparatus 100, and formed from a combination of LCDs, LEDs, sound generating elements, and the like. Some functions of the display unit 54 are provided within an optical finder 104.

The display contents of the display unit 54, displayed on the LCD or the like, include indication of single-shot/sequential shooting, a self timer, a compression ratio, an ISO (International Organization for Standardization) sensitivity, the number of recording pixels, the number of recorded images, the number of recordable images, a shutter speed, an f-number, exposure compensation, flash illumination, pink-eye effect mitigation, macro photographing, a buzzer-set state, a remaining timer battery level, a remaining battery level, an error state, information of plural digit numbers, the attached/detached status of the recording media 200 and 210, the attached/detached status of the lens unit 300, the operation of a communication I/F, date and time, and a connection state to an external computer.

Further, the display contents of the display unit 54, displayed within the optical finder 104, include a focus state, a photographing "ready" state, a camera shake warning, a flash charge state, a flash charge completion state, a shutter speed, an f-number, exposure compensation, and write operation into a recording medium. The display contents of the display unit 54, displayed on the LED or the like, include a focus state, a photographing "ready" state, a camera shake warning, a flash charge state, a flash charge completion state, write operation into a recording medium, a macro photographing setting notification, and a secondary battery charge state. The display contents of the display unit 54, displayed on the lamp or the like, include a self-timer notification lamp. The self-timer notification lamp may also be used for AF auxiliary light.

A nonvolatile memory 56 is an electrically erasable and recordable memory such as an EEPROM. The nonvolatile memory 56 stores data on various parameters, set values such as the ISO sensitivity, and set modes. Operation means 60, 62, 64, 66, 68, 69, and 70 are used to input various operation instructions to the system controller 50, and comprise one or a plurality of combinations of switches, dials, touch panels, a device for pointing by line-of-sight detection, a voice recognition device, and the like. These operation means will be described in detail.

The mode dial switch 60 allows switching and setting function photographing modes such as an automatic photographing mode, a programmed photographing mode, a shutter speed priority photographing mode, a stop priority photographing mode, a manual photographing mode, a focal depth priority (depth) photographing mode, a portrait photographing mode, a landscape photographing mode, a closeup photographing mode, a sports photographing mode, a night view photographing mode, and a panoramic photographing mode. The shutter switch SW1 62 is turned on by half stroke of the shutter button (not shown) to designate the start of the operations of AF (Auto Focus) processing, AE (Auto Exposure) processing, AWB (Auto White Balance) processing, and EF (pre-flash) processing.

The shutter switch SW2 64 is turned on by full stroke of the shutter button (not shown) to designate the start of a series of processing operations: exposure processing to write a signal read from the image sensing element 14 into the memory 30 via the A/D converter 16 and memory controller 22; development processing by using calculations by the image processor 20 and memory controller 22; and recording processing to read out image data from the memory 30, compress the image data by the compression/expansion circuit 32, and write the image data into the recording medium 200 or 210. The playback switch 66 designates the start of playback operation to read out a photographed image from the memory 30 or the recording medium 200 or 210 in a photographing mode and display the image on the image display unit 28.

The single-shot/sequential shooting switch 68 allows setting a single-shot mode in which an image of one frame is shot and then the device stands by when the shutter switch SW2 64 is pressed, and a sequential shooting mode in which images are sequentially shot while the shutter switch SW2 64 is kept pressed. The ISO sensitivity setting switch 69 enables setting an ISO sensitivity (photographing sensitivity) by changing the gain setting in the image sensing element 14 or image processor 20.

The operation unit 70 comprises various buttons and touch panels including a menu button, a set button, a macro button, a multi-image reproduction/repaging button, a flash set button, a single-shot/sequential shooting/self-timer switching button, a forward (+) menu item selection button, a backward (−) menu item selection button, a forward (+) reproduction image search button, a backward (−) reproduction image search button, a photographing quality selection button, an exposure correction button, a date/time set button, a selection/switching button for selecting and switching various functions in executing photographing and reproduction in a panoramic mode or the like, a determination/execution button for setting determination and execution of various functions in executing photographing and reproduction in a panoramic mode or the like, an image display ON/OFF switch for setting the ON/OFF state of the image display unit 28, and a quick review ON/OFF switch for setting a quick review function of automatically playing back photographed image data immediately after photographing.

The operation unit 70 also comprises a compression mode switch for selecting the compression ratio of JPEG (Joint Photographic Experts Group) compression or selecting a CCDRAW mode in which a signal from the image sensing element 14 is directly digitized and recorded on a recording medium, a reproduction switch capable of setting function modes such as a reproduction mode, multi-image reproduction/erase mode, and PC (Personal Computer) connection mode, and an AF mode set switch capable of setting a one-shot AF mode in which, if the shutter switch SW1 62 is pressed, auto focus operation starts and once the image is in focus, the focus state is maintained, and a servo AF mode in which auto focus operation is kept performed while the shutter switch SW1 is kept pressed. The use of a rotary dial switch allows more easily selecting numerical values and functions with the "+" and "−" buttons.

A power switch 72 allows switching and setting the power ON/OFF mode of the image processing apparatus 100. The power switch 72 also allows switching and setting the power ON/OFF settings of various accessory devices including the lens unit 300, external flash, and recording media 200 and 210 which are connected to the image processing apparatus 100. A power control means 80 comprises a battery detection circuit, a DC/DC converter, a switch circuit to switch a block to be energized, and the like. The power control means 80 detects the attached/detached state of the battery, a battery type, and a remaining battery power level, controls the DC/DC converter based on the results of detection and an instruction from the system controller 50, and supplies a necessary voltage to respective parts including a recording medium for a necessary period. Connectors 82 and 84 connect the power control means 80 and a power source means 86. The power source means 86 comprises a primary battery such as an alkaline battery or lithium battery, a secondary battery such as an NiCd battery, NiMH battery, or Li battery, an AC adaptor, and the like.

Interfaces 90 and 94 interface the recording media 200 and 210 such as a memory card and hard disk. Connectors 92 and 96 connect the image processing apparatus 100 and the recording media 200 and 210 such as a memory card and hard disk. A recording medium attached/detached state detection means 98 detects the connectors 92 and 96, or whether the recording medium 200 or 210 is attached to the connector 92 or 96.

In this embodiment, two systems of interfaces and connectors for connection with the recording medium are employed. However, one or a plurality of systems of interfaces and connectors for connection with the recording medium may be provided. Further, interfaces and connectors pursuant to different standards may be combined. As the interfaces and connectors, cards in conformity with PCMCIA (Personal Computer Memory Card International Association) card standards and cards in conformity with CF (Compact Flash®) card standards may be used.

In a case where cards and connectors in conformity with the PCMCIA standards, CF (Compact Flash®) card standards, and the like are used as the interfaces 90 and 94 and the connectors 92 and 96, image data and management information attached to the image data can be transferred between the image processing apparatus and other peripheral devices such as a computer and printer by connecting various communication cards such as a LAN card, modem card, USB (Universal Serial Bus) card, IEEE (Institute of Electrical and Electronics Engineers) 1394 card, P1284 card, SCSI (Small Computer System Interface) card, and PHS (Personal Handyphone System) card.

The optical finder 104 can receive a beam incident on the lens 310 of the lens unit 300 via the stop 312, the lens mount 306, and the lens mount 106 and mirrors 130 and 132 of the image processing apparatus 100 in a single-lens reflex camera, forming and displaying an image as an optical image. An image can be photographed by using only the optical finder 104 without using any electronic finder function on the image display unit 28. The optical finder 104 displays some functions of the display unit 54 such as a focus state, a camera shake warning, a flash charge state, a shutter speed, an f-number, and exposure compensation.

A communication means 110 has various communication functions for RS232C, USB, IEEE 1394, P1284, SCSI, modem, LAN, and wireless communication. A connector/antenna 112 functions as a connector when the image processing apparatus 100 is connected to another device via the communication means 110, and as an antenna for wireless communication. An interface 120 connects the image processing apparatus 100 to the lens unit 300 in the lens mount 106.

A connector 122 electrically connects the image processing apparatus 100 to the lens unit 300. A lens attached/detached state detection means 124 detects whether the lens unit 300 is mounted on the lens mount 106 and/or connector 122. The connector 122 transfers a control signal, state signal, data signal, and the like between the image processing apparatus 100 and the lens unit 300, and also has a function of supplying currents of various voltages. The connector 122 may perform not only electrical communication but also optical communication and speech communication. The mirrors 130 and 132 can guide a beam incident on the lens 310 to the optical finder 104 in a single-lens reflex camera. Note that the mirror 132 may be a quick-return mirror or half-mirror.

The recording medium 200 comprises a memory card, hard disk, or the like. The recording medium 200 has a recording unit 202 of a semiconductor memory, magnetic disk, or the like, an interface 204 for the image processing apparatus 100, and a connector 206 for connection with the image processing apparatus 100. Also, the recording medium 210 comprises a memory card, hard disk, or the like. The recording medium 210 has a recording unit 212 of a semiconductor memory, magnetic disk, or the like, an interface 214 for the image processing apparatus 100, and a connector 216 for connection with the image processing apparatus 100.

The lens unit 300 is of interchangeable lens type. The lens mount 306 mechanically couples the lens unit 300 to the image processing apparatus 100. The lens mount 306 incorporates various functions for electrically connecting the lens unit 300 to the image processing apparatus 100. The photographing lens 310 transmits an object image. The stop 312 adjusts the quantity of light entering from the photographing lens 310. An interface 320 interfaces the lens unit 300 to the image processing apparatus 100 within the lens mount 306. A connector 322 electrically connects the lens unit 300 to the image processing apparatus 100. The connector 322 transfers a control signal, state signal, data signal, and the like between the image processing apparatus 100 and the lens unit 300, and also has a function of receiving or supplying currents of various voltages. The connector 322 may perform not only electrical communication but also optical communication and speech communication.

The stop control means 340 controls the stop 312 on the basis of photometry information from the photometry means 46 of the image processing apparatus 100 in association with the shutter control means 40 which controls the shutter 12. The distance measurement control means 342 controls focusing of the photographing lens 310. A zoom control means 344 controls zooming of the photographing lens 310. A lens system controller 350 controls the whole lens unit 300. The lens system controller 350 also functions as a memory which stores operation constants, variables, programs, and the like, and a nonvolatile memory which holds identification information such as a number unique to the lens unit 300, management information, pieces of function information such as a full-aperture f-number, minimum f-number, and focal length, and current and past set values.

The operation of the image processing apparatus 100 with the above arrangement according to the embodiment will be described in detail below with reference to FIGS. 1 to 10.

<Main Routine of Image Processing Apparatus 100>

Figure 2:
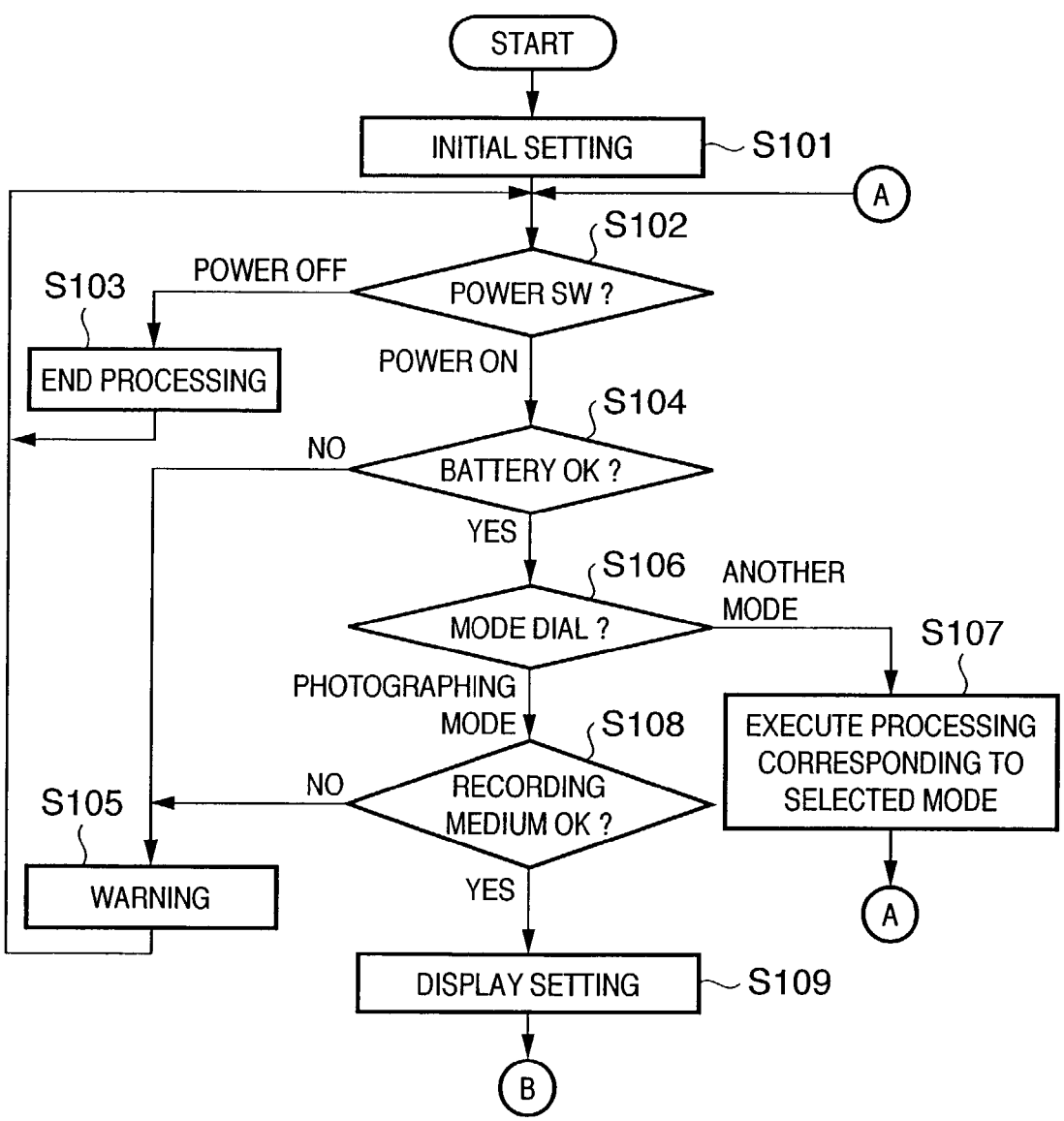
FIG. 2 is a flow chart showing the main routine of the image processing apparatus according to the embodiment.
Figure 3:
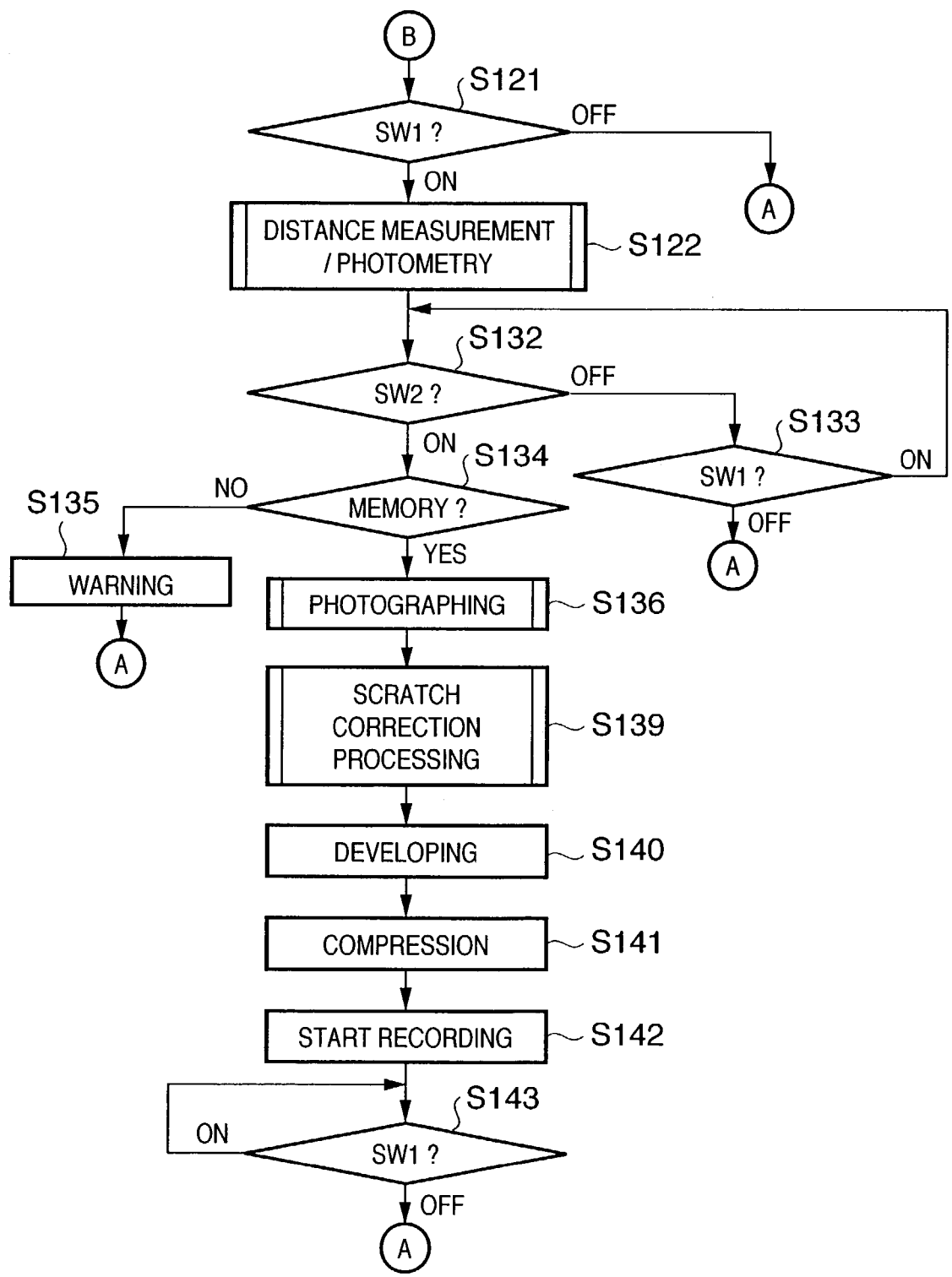
FIG. 3 is a flow chart showing the main routine of the image processing apparatus according to the embodiment.

FIGS. 2 and 3 are flow charts showing the main routine of the image processing apparatus 100 according to the embodiment. The operation of the image processing apparatus 100 will be described with reference to FIGS. 2 and 3. If the image processing apparatus 100 is powered on by, e.g., replacing batteries, the system controller 50 initializes flags such as a flash flag to be described later, control variables, and the like, and performs predetermined initial settings necessary for the respective parts of the image processing apparatus 100 (step S101). The system controller 50 determines the set position of the power switch 72 (step S102).

If the power switch 72 is set to power-off ("power OFF" in step S102), the system controller 50 performs predetermined end processing such that the display of each display unit is changed to an end state, necessary parameters including flags and control variables, set values, and set modes are stored in the nonvolatile memory 56, and unnecessary power supplies of the respective parts of the image processing apparatus 100 including the image display unit 28 are turned off by the power control means 80 (step S103). After that, the system controller 50 returns to step S102. If the power switch 72 is set to power-on ("power ON" in step S102), the system controller 50 causes the power control means 80 to determine whether the remaining capacity or operation status of the power source 86 formed from a battery or the like inhibits the operation of the image processing apparatus 100 (step S104).

If the power source 86 has any problem (NO in step S104), the system controller 50 generates a predetermined warning display output or warning sound output by an image or sound using the display unit 54 (step S105), and returns to step S102. If the power source 86 has no problem (YES in step S104), the system controller 50 determines the set position of the mode dial switch 60 (step S106). If the mode dial switch 60 is set to a photographing mode ("photographing mode" in step S106), the system controller 50 advances to step S108. If the mode dial switch 60 is set to another mode ("another mode" in step S106), the system controller 50 executes processing corresponding to the selected mode (step S107), and after ending the processing, returns to step S102.

If the mode dial switch 60 is set to the photographing mode, the system controller 50 determines whether the recording medium 200 or 210 is mounted in the image processing apparatus 100, acquires management information of image data recorded on the recording medium 200 or 210, and determines whether the operation state of the recording medium 200 or 210 inhibits the operation of the image processing apparatus 100, particularly image data recording/reproduction operation with respect to the recording medium (step S108). If the recording medium 200 or 210 has any problem as a result of determination (NO in step S108), the system controller 50 generates a predetermined warning display output or warning sound output by an image or sound using the display unit 54 (step S105), and returns to step S102. If the recording medium 200 or 210 has no problem as a result of determination (YES in step S108), the system controller 50 advances to step S109.

The system controller 50 generates display outputs and sound outputs for various set states of the image processing apparatus 100 by images and sound using the display unit 54 (step S109). If the image display of the image display unit 28 is ON, the system controller 50 also uses the image display unit 28 to generate display outputs and sound outputs for various set states of the image processing apparatus 100 by images and sound. The system controller 50 determines the state of the shutter switch SW1 62 (step S121). If the shutter switch SW1 62 is not pressed ("OFF" in step S121), the system controller 50 returns to step S102. If the shutter switch SW1 62 is pressed ("ON" in step S121), the system controller 50 performs distance measurement/ photometry processing of focusing the photographing lens 310 on an object to be photographed by distance measurement processing, and deciding an f-number and shutter time by photometry processing (step S122). Thereafter, the system controller 50 shifts to step S123. In photometry processing, the flash is also set, as needed. Details of distance measurement/photometry processing step S122 will be explained later with reference to FIG. 4.

The system controller 50 determines the state of the shutter switch SW2 64 (step S132). If the shutter switch SW2 64 is not pressed ("OFF" in step S132), the system controller 50 determines the state of the shutter switch SW1 62 (step S133). If the shutter switch SW1 62 is ON, the system controller 50 returns to step S132; if the shutter switch SW1 62 is OFF, to step S102. If the shutter switch SW2 64 is pressed ("ON" in step S132), the system controller 50 determines whether the memory 30 has an image storage buffer area capable of storing photographed image data (step S134).

If the image storage buffer area of the memory 30 does not have any area capable of storing new image data (NO in step S134), the system controller 50 generates a predetermined warning display output or warning sound output by an image or sound using the display unit 54 (step S135), and returns to step S102. This situation occurs when, for example, the first image which should be read out from the memory 30 and written into the recording medium 200 or 210 has not been recorded yet on the recording medium 200 or 210, and no free area even for one image can be ensured in the image storage buffer area of the memory 30 immediately after sequential shooting by the maximum number of images which can be stored in the image storage buffer area of the memory 30.

To store photographed image data in the image storage buffer area of the memory 30 after compression, whether the storage area can be ensured in the image storage buffer area of the memory 30 is determined in step S134 in consideration of the fact that the compressed image data amount changes depending on the settings of the compression mode.

If the memory 30 has an image storage buffer area capable of storing photographed image data (YES in step S134), the system controller 50 executes photographing processing of reading out from the image sensing element 14 an image sensing signal accumulated a predetermined time after image sensing, and writing the photographed image data into a predetermined area of the memory 30 via the A/D converter 16, image processor 20, and memory controller 22, or via the memory controller 22 directly from the A/D converter 16 (step S136). Details of photographing processing step S136 will be described later with reference to FIGS. 5 and 6. After photographing processing step S136, the system controller 50 shifts to defective pixel correction processing (scratch correction processing) step S139. Details of scratch correction processing step S139 will be explained later with reference to FIG. 8.

The system controller 50 reads out via the memory controller 22 part of image data written in the predetermined area of the memory 30 after scratch correction processing, performs WB (White Balance) integral calculation processing and OB (Optical Black) integral calculation processing necessary for developing processing, and stores the results of calculations in the internal memory of the system controller 50 or the memory 52. The system controller 50 reads out the photographed image data written in the predetermined area of the memory 30 after scratch correction by using the memory controller 22, and if necessary, the image processor 20. The system controller 50 executes various developing processes including AWB (Auto White Balance) processing, gamma conversion processing, and color conversion processing by using the results of calculations stored in the internal memory of the system controller 50 or memory 52 (step S140).

The system controller 50 reads out the image data written in the predetermined area of the memory 30, and performs image compression processing corresponding to the set mode by the compression/expansion circuit 32 (step S141). The system controller 50 writes image data having undergone a series of processes after photographing into a free image portion of the image storage buffer area of the memory 30. Along with execution of a series of photographing processes, the system controller 50 reads out the image data stored in the image storage buffer area of the memory 30, and starts recording processing of writing the image data into the recording medium 200 or 210 such as a memory card or compact flash® card via the interface 90 or 94 and the connector 92 or 96 (step S142).

Every time image data having undergone a series of processes after photographing is newly written into a free image portion of the image storage buffer area of the memory 30, recording start processing to the recording medium 200 or 210 is executed for the image data. During write of the image data into the recording medium 200 or 210, recording medium write operation is displayed by flickering, e.g., an LED on the display unit 54 in order to explicitly indicate that write operation is in progress.

The system controller 50 determines the state of the shutter switch SW1 62 (step S143). While the shutter switch SW1 62 is pressed, the system controller 50 waits until the shutter switch SW1 62 is released. If the shutter switch SW1 62 is not pressed, the system controller 50 returns to step S102.

<Distance Measurement/Photometry Processing>

Figure 4:
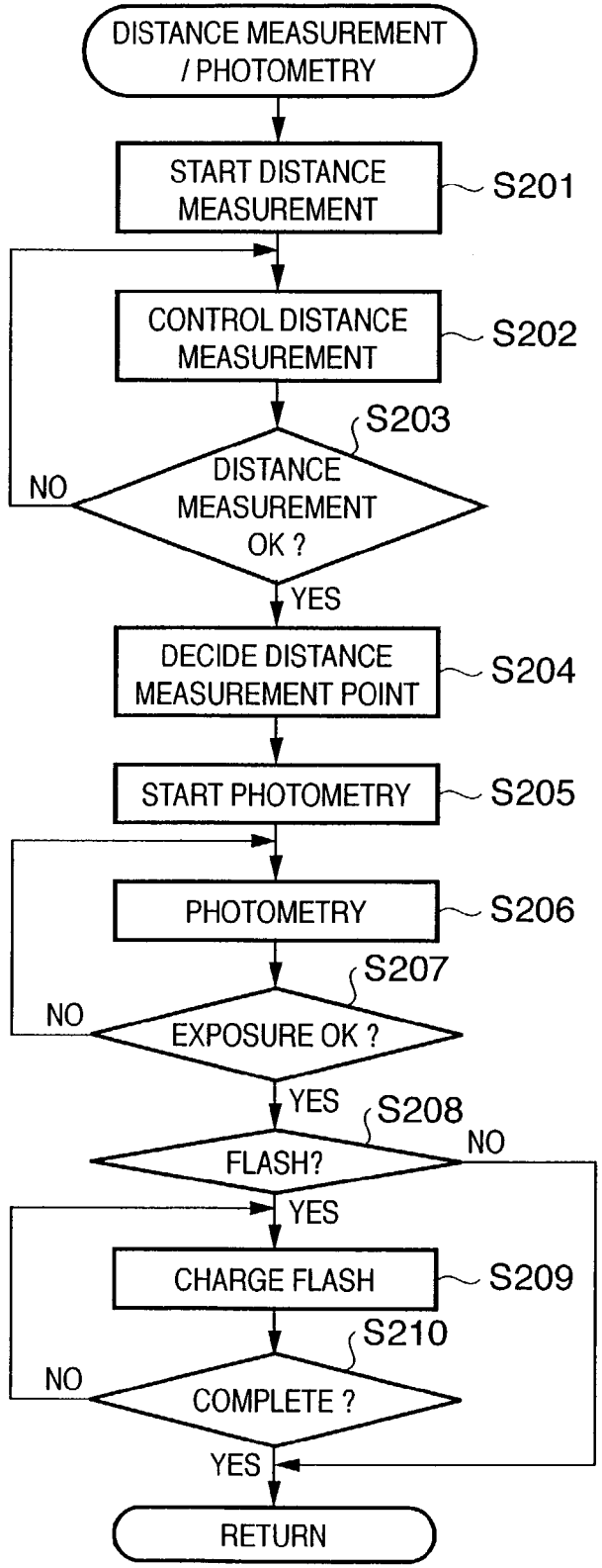
FIG. 4 is a flow chart showing a distance measurement/photometry processing routine in the image processing apparatus according to the embodiment.

FIG. 4 is a flow chart showing details of distance measurement/photometry processing in step S122 of FIG. 3. In distance measurement/photometry processing, various signals are exchanged between the system controller 50 of the image processing apparatus 100 and the stop control means 340 or distance measurement control means 342 of the lens unit 300 via the interface 120, connector 122, connector 322, interface 320, and lens control means 350. The system controller 50 starts AF (Auto Focus) processing by using the image sensing element 14, distance measurement means 42, and distance measurement control means 342 (step S201).

The system controller 50 causes a beam incident on the lens 310 of the lens unit 300 to enter the distance measurement means 42 via the stop 312, the lens mount 306, and the lens mount 106, mirror 130, and distance measurement sub-mirror (not shown) of the image processing apparatus 100, thereby determining the focus state of an image formed as an optical image. While driving the lens 310 by using the distance measurement control means 342 of the lens unit 300 until the image is determined to be in focus by distance measurement (AF) (step S203), the system controller 50 executes AF control of detecting the focus state by using the distance measurement means 42 of the image processing apparatus 100 (step S202). If the image is determined to be in focus by distance measurement (AF) (YES in step S203), the system controller 50 decides a distance measurement point where the image is in focus from a plurality of distance measurement points within the photographing frame. The system controller 50 stores distance measurement data and set parameters (or either of distance measurement data and set parameters) in the internal memory of the system controller 50 or the memory 52 together with the decided distance measurement point data, and advances to step S205.

The system controller 50 starts AE (Auto Exposure) processing by using the photometry control means 46 (step S205). The system controller 50 causes a beam incident on the lens 310 of the lens unit 300 to enter the photometry means 46 via the stop 312, the lens mount 306, and the lens mount 106, mirrors 130 and 132, and photometry lens (not shown) of the image processing apparatus 100, thereby measuring the exposure state of an image formed as an optical image. The system controller 50 performs photometry processing by using the exposure control means 40 (step S206) until exposure (AE) is determined to be proper at an ISO sensitivity set in advance by the ISO sensitivity setting switch 69 (step S207). If exposure (AE) is determined to be proper (YES in step S207), the system controller 50 stores photometry data and set parameters (or either of photometry data and set parameters) in the internal memory of the system controller 50 or the memory 52, and advances to step S208.

The system controller 50 decides an f-number (Av value) and shutter speed (Tv value) in accordance with the exposure (AE) result detected in photometry processing step S206 and a photographing mode set by the mode dial switch 60. The system controller 50 decides the charge accumulation time of the image sensing element 14 in accordance with the decided shutter speed (Tv value), and performs photographing processing for the same charge accumulation time.

The system controller 50 determines from measurement data obtained in photometry processing step S206 whether the flash is required (step S208). If the flash is necessary, the flash-flag is set, and the flash 48 is charged (step S209) until the flash 48 is fully charged (step S210). If the flash 48 has been charged (YES in step S210), the system controller 50 ends the distance measurement/photometry processing routine (step S122 of FIG. 3).

<Photographing Processing>

Figure 5:
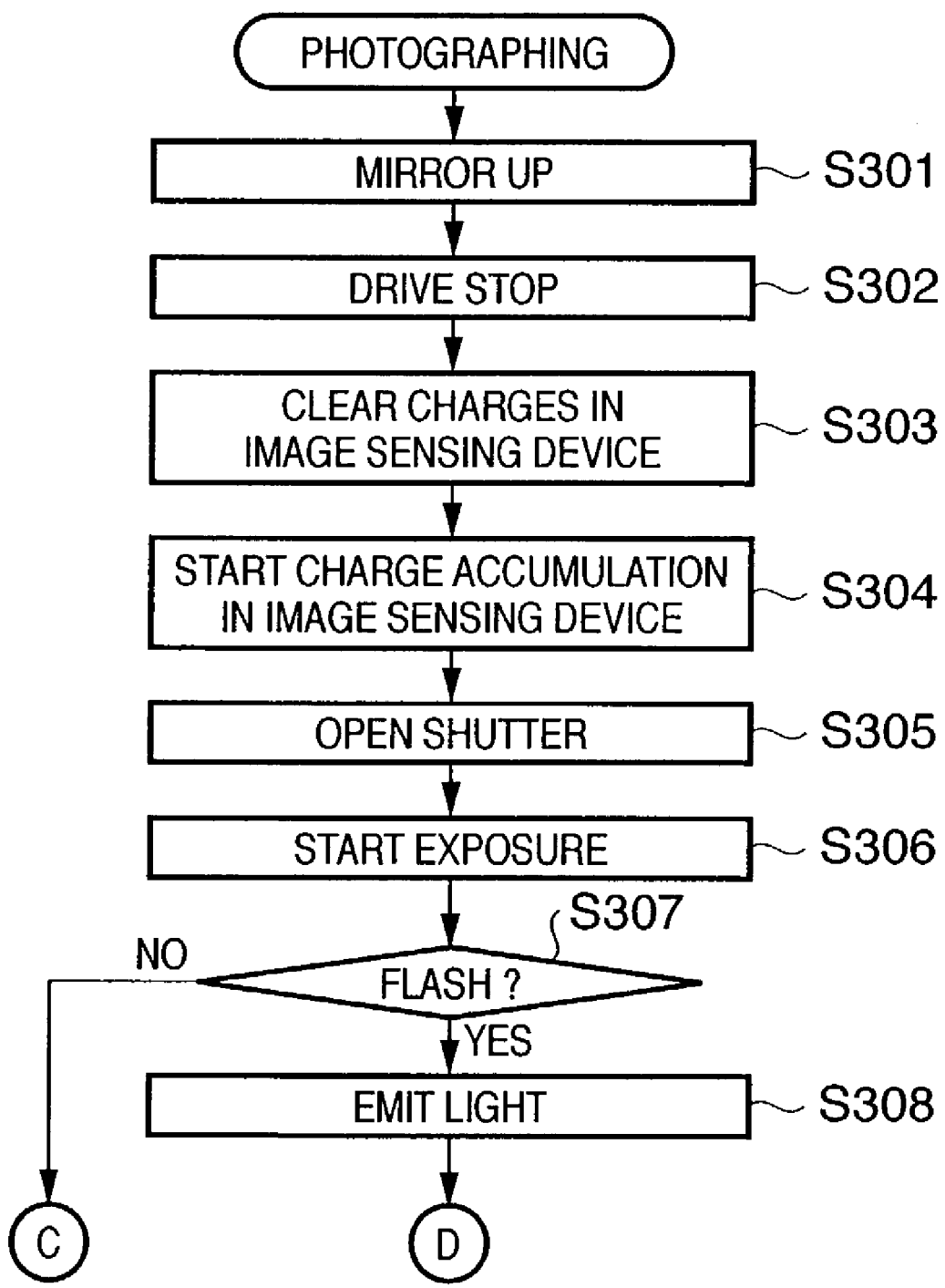
FIG. 5 is a flow chart showing a photographing processing routine in the image processing apparatus according to the embodiment.
Figure 6:
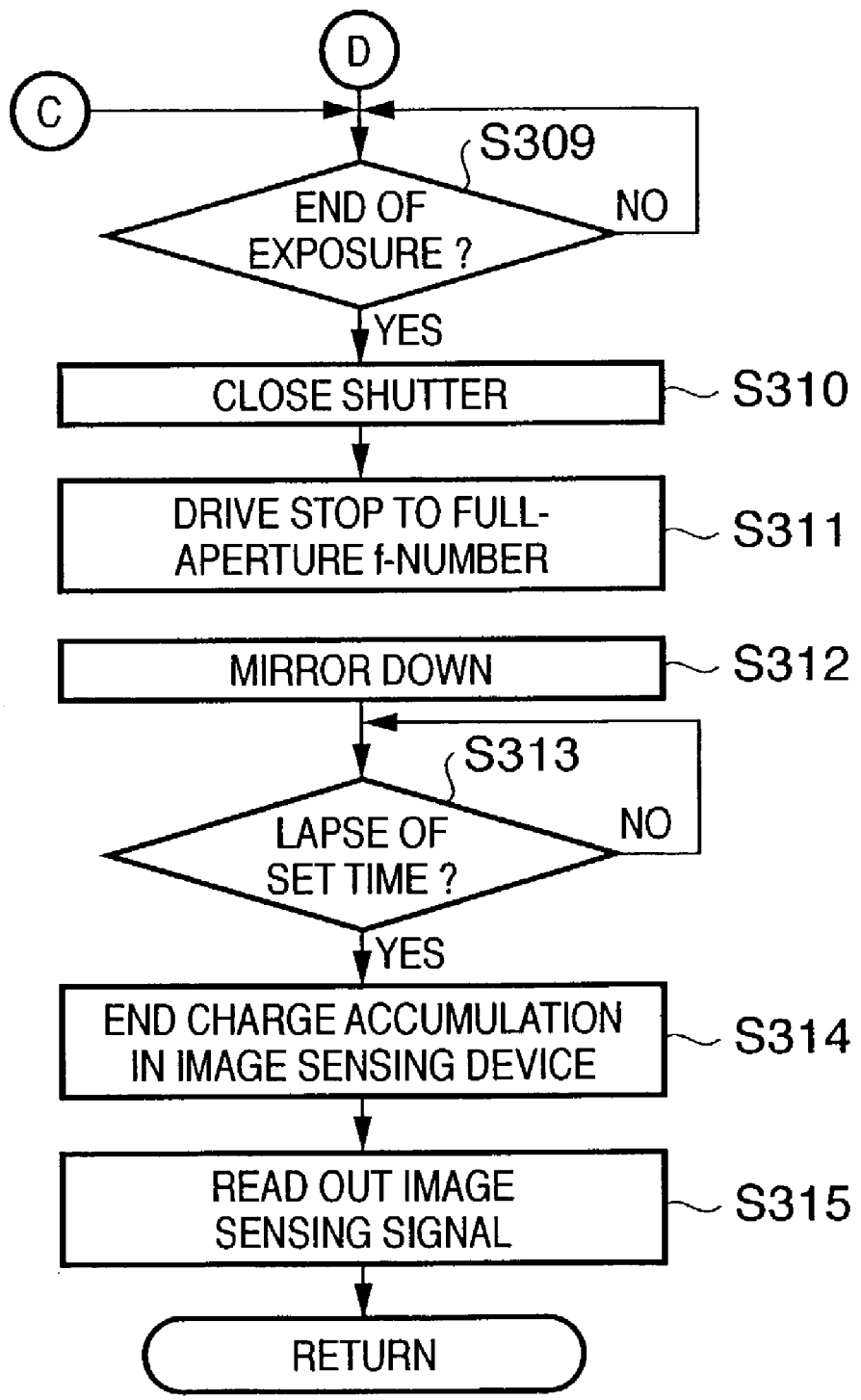
FIG. 6 is a flow chart showing the photographing processing routine in the image processing apparatus according to the embodiment.

FIGS. 5 and 6 are flow charts showing details of photographing processing in step S136 of FIG. 3. In photographing processing, various signals are exchanged between the system controller 50 of the image processing apparatus 100 and the stop control means 340 or distance measurement control means 342 of the lens unit 300 via the interface 120, connector 122, connector 322, interface 320, and lens control means 350. The system controller 50 moves the mirror 130 to a mirror-up position by a mirror driving means (not shown) (step S301). The system controller 50 drives the stop 312 to a predetermined f-number by the stop control means 340 in accordance with photometry data stored in the internal memory of the system controller 50 or the memory 52 (step S302).

The system controller 50 executes charge clear operation for the image sensing element 14 (step S303). After charge accumulation in the image sensing element 14 starts (step S304), the system controller 50 opens the shutter 12 by the shutter control means 40 (step S305), and starts exposure of the image sensing element 14 (step S306). The system controller 50 determines from the flash flag whether the flash 48 is required (step S307), and if the flash 48 is required, causes the flash 48 to emit light (step S308). The system controller 50 waits for the end of exposure of the image sensing element 14 in accordance with photometry data (step S309). The system controller 50 closes the shutter 12 by the shutter control means 40 (step S310), and ends exposure of the image sensing element 14.

The system controller 50 drives the stop 312 to a full-aperture f-number by the stop control means 340 of the lens unit 300 (step S311), and moves the mirror 130 to a mirror-down position by the mirror driving means (not shown) (step S312). Upon the lapse of a set charge accumulation time (YES in step S313), the system controller 50 ends charge accumulation in the image sensing element 14 (step S314). The system controller 50 reads a charge signal from the image sensing element 14, and writes photographed image data into a predetermined area of the memory 30 via the A/D converter 16, image processor 20, and memory controller 22, or via the memory controller 22 directly from the A/D converter 16 (step S315). After a series of processes end, the system controller 50 ends the photographing processing routine (step S136 of FIG. 3).

<Scratch Correction Processing>

Figure 8:
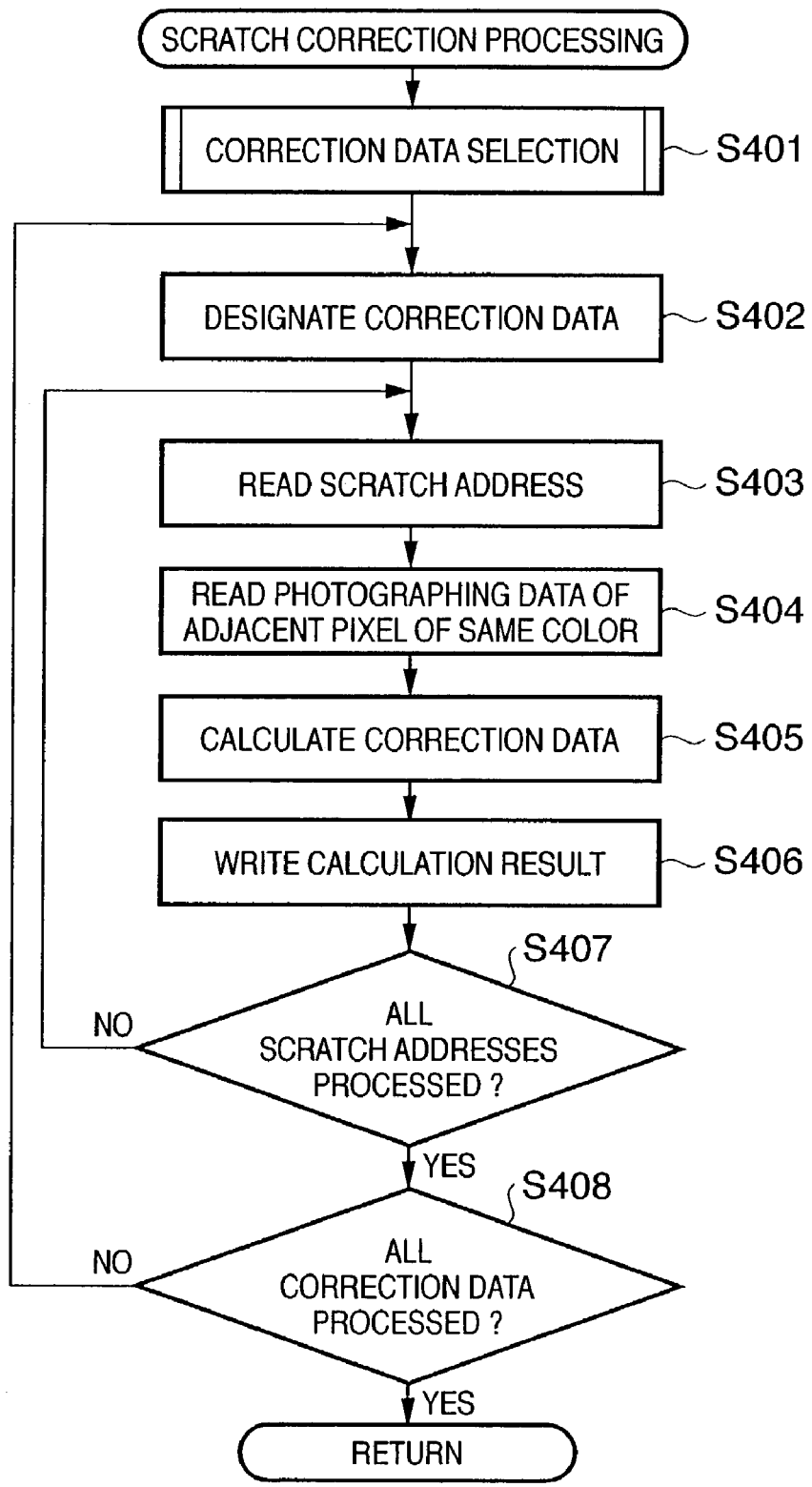
FIG. 8 is a flow chart showing a scratch correction processing routine in the image processing apparatus according to the embodiment.

FIG. 8 is a flow chart showing details of scratch correction processing in step S139 of FIG. 3. The system controller 50 of the image processing apparatus 100 selects scratch correction data used to perform scratch correction processing (step S401). In this case, a plurality of scratch correction data are saved in the nonvolatile memory 56 or the internal memory of the system controller 50. Scratch correction data to be actually used in scratch correction processing after photographing is selected. At least one of scratch correction data is data holding defective pixel address information selected in accordance with the output level from pieces of information obtained by sorting, in the output level order, defective pixels detected in advance. At least one of scratch correction data different from this data is data holding defective pixel address information selected in accordance with the number of available address data (equal to or smaller than the number of data which can be described in single scratch correction data) from pieces of information obtained by sorting, in the output level order, defective pixels detected in advance.

Figure 9:
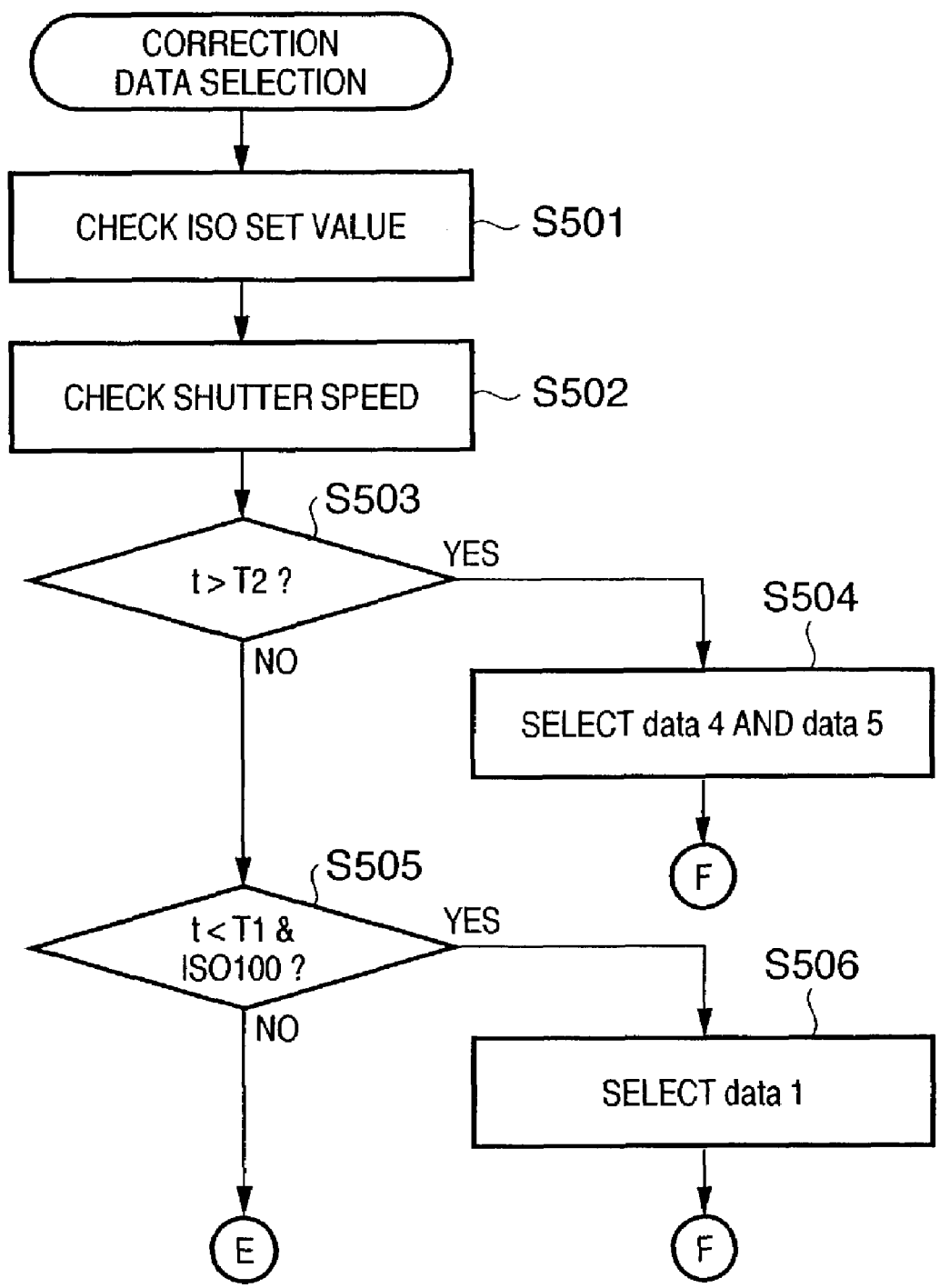
FIG. 9 is a flow chart showing the scratch correction data selection method used for scratch correction processing in the image processing apparatus according to the embodiment.
Figure 10:
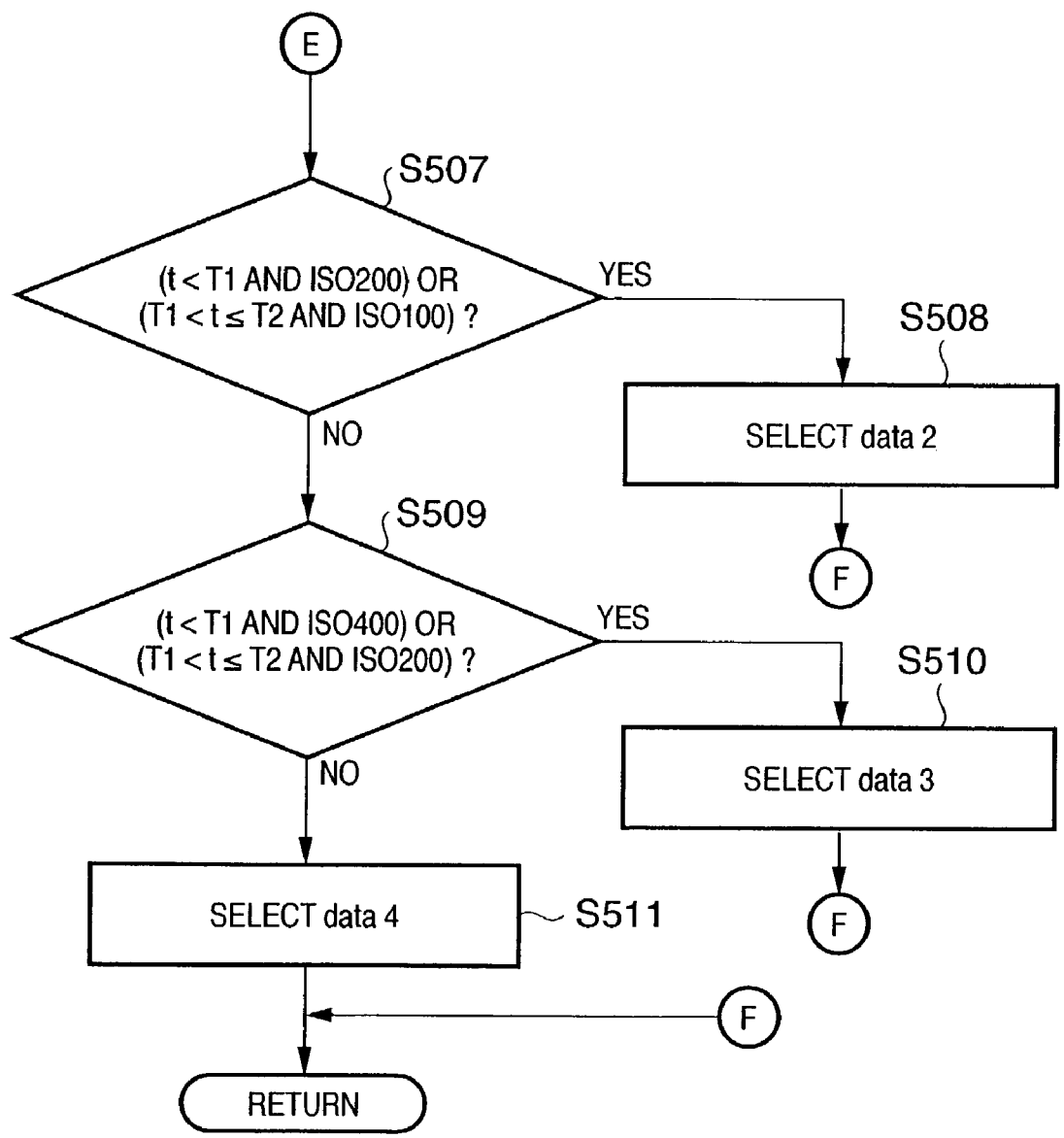
FIG. 10 is a flow chart showing the scratch correction data selection method used for scratch correction processing in the image processing apparatus according to the embodiment.

A scratch correction data selection sequence will be explained in detail with reference to FIGS. 9 and 10. FIGS. 9 and 10 are flow charts showing details of correction data selection for scratch correction in step S401 of FIG. 8. In shipping the image sensing element 14, various scratched pixels (defective pixels) are extracted on the basis of image data obtained during a predetermined charge accumulation time at a predetermined ambient temperature. Data to be stored in the internal memory of the image processing apparatus 100 is generated based on shipping data which describes the types, addresses, and scratch levels of scratched pixels. This processing is executed outside the image processing apparatus 100.

More specifically, the white scratch of the image sensing element 14 that requires correction processing is determined in accordance with a photographing situation. Most of white scratches tend to increase their levels in accordance with the exposure time (charge accumulation time) of the image sensing element 14. Even white scratches at the same level change their scratch levels depending on a set ISO sensitivity (gains of the image sensing element 14 and image processor 20).

For this reason, e.g., a table of the set ISO sensitivity and exposure time (charge accumulation time) is set. A pixel which requires correction in each region of the image sensing element 14 is determined by the scratch level in shipping data. The system controller 50 decides the charge accumulation time of the image sensing element 14 in accordance with the shutter speed (Tv value) decided in photometry processing (step S206 of FIG. 4). The system controller 50 performs processing corresponding to this charge accumulation time. As shown in FIG. 7A, the ISO sensitivity is set to 100, 200, and 400. In step S206 of FIG. 4, the charge accumulation time (t) in this table is divided into three zones: a region higher in speed (shorter) than T1 sec; a region from T1 sec to T2 (>T1); and a region lower in speed (longer) than T2 sec.

In general, a longer charge accumulation time increases the scratch level of a white scratch, and an output from a pixel at a negligible level within short seconds may increase to a high scratch level in long seconds. After photographing in short and long seconds, a white scratched pixel to be corrected is collated with shipping data. The determination level must be set by the scratch level value in shipping data such that each region of the image sensing element 14 contains a white scratched pixel.

For example, at ISO 100 within a charge accumulation time higher in speed (shorter) than time T1 (YES in step S505), the determination level in the region is set to 100 mV if no white scratch can be determined from a corrected image as a result of correcting only a white scratch whose scratch level exhibits 100 mV or higher in shipping data (step S506). As for ISO, even a white scratch which cannot be determined at ISO 100 multiplies the image output by two and four times at ISO 200 and ISO 400, respectively. The respective determination levels are so set as to extract scratched pixels exhibiting scratch levels of, e.g., 50 mV or higher and 25 mV or higher in shipping data.

Pieces of address information of scratched pixels are extracted from shipping data in accordance with the respective determination levels set in the table. These pieces of address information are converted into an optimal format and written in a memory (e.g., the nonvolatile memory 56 or the internal memory of the system controller 50) which can be used by the image processor 20. At this time, data are formed into one data file for each table region. For example, data obtained by extracting only scratches at 100 mV or higher will be called "data 1". Similarly, data obtained by extracting only scratches at 50 mV or higher, and data obtained by extracting only scratches at 25 mV or higher will be called "data 2" and "data 3", respectively.

With this processing, when scratch correction processing operation is to be performed, correction data is selected from the correspondence table on the basis of the ISO sensitivity and the exposure time set in photographing. Correction processing is performed for a target scratched pixel by a method to be described later in accordance with scratch address information described in the correction data, completing necessary scratch correction processing. Each correction data contains only address information of a pixel to be corrected, scratch level determination operation can be omitted, and scratch correction processing can be performed at a high speed. In this data structure, for example, the address of a scratched pixel at a scratch level of 100 mV or higher in shipping data is repetitively described in all "data 1", "data 2", and "data 3". However, this method is very effective for high-speed processing.

However, the charge accumulation time of the image sensing element 14 becomes longer in the region from time T1 to time T2, and even a lower-level scratch becomes conspicuous. Assume that scratches at 50 mV or higher in shipping data must be corrected at ISO 100 (YES in step S507) In this case, "data 2" used in the region higher in speed (shorter) than time T1 at ISO 200 can be used (step S508). Similarly, at ISO 200 (YES in step S509), "data 3" is used to correct scratches at 25 mV or higher (step S510). At ISO 400, "data 4" obtained by extracting scratched pixels at 12.5 mV or higher is used (step S511) to correct scratched pixels.

Various limitations are imposed on a memory area which can be assigned to one scratch data. These limitations include a limitation by the total capacity of a physical memory, a limitation on addresses accessible by the system controller 50 at a high speed, and a limitation on the memory of a tester which detects shipping data.

As the scratch determination level decreases, the number of scratched pixels extracted abruptly increases. For example, the number of scratched pixels is several hundred at a determination level of 25 mV or higher, but increases to several thousand at a half determination level of 12.5 mV. In this case, the memory area may reach an assignable memory limitation, failing to execute correction processing for all scratched pixels. In this case, scratched pixels are sorted from shipping data in descending order of the scratch level. A number n of scratches correctable by single correction data which can be calculated by an assignable memory amount is determined in advance. After that, n scratched pixels are extracted in descending order of the scratch level, and correction data is generated using the addresses of only these pixels.

Strictly speaking, all scratched pixels which should be corrected are not corrected. This determination is however effective in consideration of the correction time taken for scratch correction processing operation, the complication of the scratch correction processing sequence, and the influence on an image by a small scratched pixel which cannot be corrected and remains near the determination level when the determination level drops, as far as no large difference exists between the number of scratches which are actually extracted from shipping data and should be corrected and the number n of correctable scratches. If a large difference exists between the number of scratches which are actually extracted from shipping data and should be corrected and the number n of correctable scratches, this can be coped with by the following operation.

"data 4" is, therefore, data obtained by sorting scratched pixels from shipping data in descending order of the scratch level, determining the number n of correctable scratches, extracting n scratched pixels in descending order of the scratch level, extracting pieces of address information of these scratched pixels, and converting the information into a format optimal for a memory (e.g., the nonvolatile memory 56 or the internal memory of the system controller 50) usable by the image processor 20.

In a region where the charge accumulation time is lower in speed (longer) than time T2, the level of a scratch to be corrected further drops. In this region, a system capable of "bulb photographing" requires scratch correction processing operation which takes a further level drop into consideration. In this region, as large a number of white scratches as possible are corrected regardless of the ISO sensitivity set value. "data 4" obtained by sorting scratched pixels from shipping data in descending order of the scratch level and extracting n scratched pixels in descending order of the scratch level, and correction data "data 5" obtained by extracting n scratched pixels from the (n+1)th scratched pixel (up to the (2*n)th scratched pixel from a high-level scratched pixel) and using only the addresses of these pixels are generated.

When the region where the charge accumulation time is lower in speed (longer) than time T2 is selected, "data 5" is selected again as scratch correction processing after "data 4" processing to be described later, and scratch correction processing is performed using this data. In a region with a shorter exposure time (and charge accumulation time), scratch correction processing is done using single data for high-speed processing in order to shorten the release time lag and photographing frame interval. In a low-speed (long) exposure time region, like the above region, at least the photographing frame interval can be ignored, and a long time can be ensured for scratch correction processing after photographing.

This processing enables scratch correction processing for 2n scratched pixels at maximum in the region where the charge accumulation time is lower in speed (longer) than time T2. FIG. 7B shows a scratch correction data selection table set using the ISO sensitivity and charge accumulation time on the basis of the above-described operation. As described above, scratch correction data for use is selected from the table of FIG. 7B in accordance with the currently set ISO sensitivity and the charge accumulation time decided in accordance with the shutter speed (Tv value) set in photometry processing (step S206 of FIG. 3).

The scratch correction data selection sequence in FIGS. 9 and 10 will be explained step by step in accordance with the above description. The system controller 50 checks the ISO sensitivity set value (e.g., 100, 200, or 400) (step S501), and checks the shuter speed (step S502). The system controller 50 then determines whether the charge accumulation time t>T2 (step S503) For the charge accumulation time t>T2, the system controller 50 selects "data 4" and "data 5" (step S504) If NO in step S503, the system controller 50 determines whether the charge accumulation time t<T1 and the ISO sensitivity set value is 100 (step S505).

For the charge accumulation time t<T1 and the ISO sensitivity set value=100, the system controller 50 selects "data 1" (step S506). If NO in step S505, the system controller 50 determines whether the charge accumulation time t<T1 and the ISO sensitivity set value is 200 or whether T1<the charge accumulation time t<T2 and the ISO sensitivity set value is 100 (step S507).

For the charge accumulation time t<T1 and the ISO sensitivity set value=200, or for T1<the charge accumulation time t≦T2 and the ISO sensitivity set value=100, the system controller 50 selects "data 2" (step S508). If NO in step S507, the system controller 50 determines whether the charge accumulation time t<T1 and the ISO sensitivity set value is 400 or whether T1<the charge accumulation time t≦T2 and the ISO sensitivity set value is 200 (step S509).

For the charge accumulation time t<T1 and the ISO sensitivity set value=400, or for T1<the charge accumulation time t≦T2 and the ISO sensitivity set value=200, the system controller 50 selects "data 3" (step S510). If NO in step S509, the system controller 50 selects "data 4" (step S511).

Referring back to FIG. 8, the system controller 50 selects scratch correction data for use in step S401, and designates scratch correction data subjected to scratch correction processing in accordance with a plurality of conditions classified by photographing conditions (the charge accumulation time of the image sensing element 14 and the ISO sensitivity) and the photographing environment (temperature) (step S402). In this step, which of scratch correction data is to be first processed is designated, in order to sequentially perform scratch correction processing for respective scratch correction data when a plurality of scratch correction data are selected in step S401. In scratch correction processing, it is appropriate to process scratch correction data in descending order of the scratch level. When a plurality of scratch correction data, e.g., data 4 and data 5 are selected, data 4 is so designated as to first process data 4, and data 5 is designated after data 4 is processed.

After designating scratch correction data used in step S402, the system controller 50 refers to information which is described in the scratch correction data designated in step S402 and represents the address of a white scratched pixel. The system controller 50 executes point scratch correction processing for a pixel corresponding to a photographed image written in a predetermined area of the memory 30 by using photographed image data of an adjacent pixel of the same color in order to compensate for the white point scratch of the image sensing element 14. The system controller 50 reads scratch address information of one pixel from the start of the selected scratch correction data (step S403). By referring to this scratch address information, the system controller 50 can specify the address of the pixel in the photographed image written in the memory 30.

The system controller 50 reads photographed image data of a pixel of the same color adjacent to the pixel whose address is specified in step S403 (step S404). The system controller 50 calculates the correction amount of the pixel from the adjacent pixel value obtained in step S404 (step S405). The system controller 50 writes the correction amount of the pixel calculated in step S405 at the address of this pixel in the memory 30 (step S406). As a result, correction processing of this pixel is completed.

The system controller 50 determines whether all scratched pixels described in the designated scratch correction data have undergone scratch correction processing (step S407). If NO in step S407, the system controller 50 returns to step S403, reads out the next scratch address information described in the scratch correction data, and repeats the same processing as that described above. If YES in step S407, the system controller 50 determines whether the next data to be corrected exists (step S408).

For example, the range of the charge accumulation time t≦T2 has one scratch correction data subjected to scratch correction processing. Thus, the system controller 50 determines in step S408 that no data to be corrected exists, completes scratch correction processing, and ends the processing. If a plurality of scratch correction data to be corrected are designated within the range of the charge accumulation time t>T2 and scratch correction processing of the first scratch correction data is completed, the system controller 50 returns to step S402, designates the next scratch correction data to be corrected, and repeats the same scratch correction processing as that described above. If all scratched pixels described in the scratch correction data selected in step S401 have undergone scratch correction processing, the scratch correction processing sequence is completed.

Scratch correction processing according to the embodiment is effective especially when the scratch determination level is set for a maximum settable shutter speed in a photographing mode other than bulb photographing and the number of scratches to be corrected at this level falls within the range of n to 2n. When the scratch determination level is set for the maximum shutter speed, the number of scratches to be corrected at this level may exceed 2n. In this case, memory allocation and the correction scratch level must be set again, and the image quality of a resultant image may be very low. Even this image can be processed by extracting 3n data to be corrected from high-level data and repeating correction processing three times, as described above. Correction processing can also be repeated by a larger number of times.

The data determination level and the number of data to be determined depend on the detectable level and detection precision of shipping data, and are decided in consideration of the detectable level, the detection precision, and the image quality of an actually obtained image. Determination processing is done outside the image processing apparatus. The image processing apparatus receives only the decided determination level and the addresses of pixels extracted by the number of data to be determined. The performance of the image processing apparatus is free from any large load.

As described above, this embodiment exhibits the following effects.

(1) Scratch correction data for use is selected from a plurality of scratch correction data in accordance with a plurality of conditions classified by photographing conditions and the photographing environment. Defective pixel correction processing is performed for an output from the image sensing element by using the selected scratch correction data. The number of defective pixels to be corrected can be properly selected from defective pixels to be interpolated, particularly white scratched pixels. Degradation of the image quality by insufficient or excessive correction of a defective pixel can be prevented.

(2) Scratch correction data holds only address information of a defective pixel to be interpolated. Defective pixel level determination operation can be omitted, unlike the prior art. High-speed, high-precision correction processing can be achieved for a defective pixel without increasing a system resource such as a memory or complicating control software.

(3) Photographing conditions used to select scratch correction data include at least the charge accumulation time and ISO sensitivity. The number of defective pixels to be corrected that changes depending on the charge accumulation time and ISO sensitivity can be appropriately selected from defective pixels to be interpolated. Degradation of the image quality by insufficient or excessive correction of a defective pixel can be prevented.

[Other Embodiment]

In the above embodiment, the table for selecting scratch correction data is set using the ISO sensitivity and charge accumulation time. The present invention is not limited to this, and a table may be set using conditions corresponding to photographing conditions and the photographing environment such as the temperature and photographing operation mode in addition to the ISO sensitivity and charge accumulation time.

In the above embodiment, photographing operation is done by moving the mirror 130 to a mirror-up position or mirror-down position. It is also possible to form the mirror 130 from a half-mirror and perform photographing operation without moving the mirror 130.

In the above embodiment, the recording media 200 and 210 are memory cards such as a PCMCIA card or compact flash®, hard disks, or the like. The recording media 200 and 210 may also include optical disks such as a micro DAT, magneto-optical disk, CD-R, or CD-RW, phase change optical disks such as a DVD, or the like. The recording media 200 and 210 may also be composite media of memory cards and hard disks. Part of the composite medium may be detachable.

In the above embodiment, the recording media 200 and 210 are separated from the image processing apparatus 100 and are arbitrarily connectable to it. Either or both of the recording media may be fixed to the image processing apparatus 100. The image processing apparatus 100 may be so constituted as to allow connecting one or an arbitrary number of recording media 200 or 210.

In the above embodiment, the recording media 200 and 210 are mounted in the image processing apparatus 100. However, one or a plurality of recording media may be mounted.

In the above embodiment, scratch correction data may be mapped from the nonvolatile memory 56 into the internal memory of the system controller 50 upon power-on of the image processing apparatus.

In the above embodiment, scratch correction processing is performed using two different scratch correction data at maximum. Scratch correction processing may be executed a larger number of times.

In the above embodiment, all pieces of pixel information necessary for correction are extracted as scratch correction data to be processed at once. If the processing speed is high enough, scratch correction processing operation may be done a plurality of number of times using scratch correction data divided at each scratch level of shipping data.

In the above embodiment, scratches to be corrected are only white point pixels. Scratched pixels of another type are desirably corrected under all conditions. In this case, pieces of address information of scratched pixels of another type must be described in respective correction data. This processing can be executed in generating correction data outside the image processing apparatus.

The present invention may be applied to a system constituted by a plurality of devices or an apparatus formed from a single device. The present invention is also achieved when a medium such as a storage medium which stores software program codes for realizing the functions of the above-described embodiments is supplied to a system or apparatus, and the computer (or the CPU or MPU) of the system or apparatus reads out and executes the program codes stored in the medium such as a storage medium.

In this case, the program codes read out from the medium such as a storage medium realize the functions of the above-described embodiments, and the medium such as a storage medium which stores the program codes constitutes the present invention. The medium such as a storage medium for supplying the program codes includes a floppy® disk, a hard disk, an optical disk, a magneto-optical disk, a CD-ROM, a CD-R, a magnetic tape, a nonvolatile memory card, a ROM, and a means of downloading via a network.

The functions of the above-described embodiments are realized when the computer executes the readout program codes. Also, the functions of the above-described embodiments are realized when an OS or the like running on the computer performs part or all of actual processing on the basis of the instructions of the program codes.

The functions of the above-described embodiments are also realized when the program codes read out from the medium such as a storage medium are written in the memory of a function expansion board inserted into the computer or the memory of a function expansion unit connected to the computer, and the CPU of the function expansion board or function expansion unit performs part or all of actual processing on the basis of the instructions of the program codes.

As has been described above, the above-described embodiments provide the following effects.

(1) Correction data for use is selected from a plurality of correction data in accordance with a plurality of conditions classified by photographing conditions and the photographing environment. Defective pixel correction processing is performed for an image sensing element by using the selected correction data. The number of defective pixels to be corrected can be properly selected from defective pixels to be interpolated, particularly white point pixels. Degradation of the image quality by insufficient or excessive correction of a defective pixel can be prevented.

(2) Correction data holds address information of a defective pixel to be interpolated. Defective pixel level determination operation can be omitted, unlike the prior art. High-speed, high-precision correction processing can be achieved for a defective pixel without increasing a system resource such as a memory or complicating control software.

(3) Photographing conditions used to select correction data include at least the charge accumulation time and photographing sensitivity, and the photographing environment includes the temperature. The number of defective pixels to be corrected that changes depending on the charge accumulation time and photographing sensitivity, the charge accumulation time, the photographing sensitivity, or the temperature can be appropriately selected from defective pixels to be interpolated. Degradation of the image quality by insufficient or excessive correction of a defective pixel can be prevented.

The present invention is not limited to the above embodiments and various changes and modifications can be made within the spirit and scope of the present invention. Therefore, to apprise the public of the scope of the present invention the following claims are made.

What is claimed is:

1. An apparatus which performs correction for a pixel of an image sensing element formed from a plurality of pixels, comprising:
    (A) a memory unit which stores first, second and third correction data that have defective pixel address information and are used to correct outputs from defective pixels of the image sensing element, the first correction data having address information of defective pixels each of which has a signal level larger than a first predetermined level, the second correction data having address information of several defective pixels selected in descending order of signal levels of the defective pixels whose signal levels are respectively larger than a second predetermined level which is smaller than the first predetermined level, and the third correction data having address information of several defective pixels selected in descending order of signal levels of the defective pixels whose signal levels are smaller than a level of the several defective pixels whose address information is included in the second correction data; and
    (B) a correction processing unit which selects correction data for use from the first, second, and combination of second and third correction data based on selection standards, and performs defective pixel correction processing for an output from the image sensing element by using the selected correction data.

2. The apparatus according to claim 1, wherein the number of address data included in the second correction data is not larger than the number of data which can be described in single correction data.

3. The apparatus according to claim 1, wherein the selection standards include conditions classified by a photographing condition or a photographing environment, the photographing condition includes a charge accumulation time or a photographing sensitivity of the image sensing element, and the photographing environment includes a temperature.

4. The apparatus according to claim 1, wherein said correction processing unit performs correction processing by using the first correction data under at least a condition in which a charge accumulation time becomes shortest out of at least conditions classified by the charge accumulation time.

5. The apparatus according to claim 1, wherein said correction processing unit performs correction processing by using the first correction data under at least some of conditions in which an ISO sensitivity becomes lowest out of at least conditions classified by the ISO sensitivity.

6. The apparatus according to claim 1, wherein said correction processing unit performs correction processing by using the first correction data under at least some of conditions in which a temperature becomes lowest out of at least conditions classified by the temperature.

7. The apparatus according to claim 1, wherein said correction processing unit decides an order of plurality of the second correction data used for correction processing.

8. The apparatus according to claim 7, wherein when single one of the first or second correction data is selected as the correction data, said correction processing unit executes correction processing on the basis of the selected correction data, and when plurality of the second correction data are selected, repetitively executes correction processing on the basis of the selected correction data in accordance with the decided order.

9. The apparatus according to claim 7, wherein said correction processing unit selects the single first correction data under at least a condition in which a charge accumulation time becomes shortest out of at least conditions classified by the charge accumulation time.

10. The apparatus according to claim 7, wherein said correction processing unit selects the single first correction data under at least some of conditions in which an ISO sensitivity becomes lowest out of at least conditions classified by the ISO sensitivity.

11. The apparatus according to claim 7, wherein said correction processing unit selects the single first correction data under at least some of conditions in which a temperature becomes lowest out of at least conditions classified by the temperature.

12. The apparatus according to claim 1, wherein the apparatus includes an image sensing apparatus.

13. A pixel correction processing method of performing correction for a pixel of an image sensing element formed from a plurality of pixels, comprising:
    selecting correction data for use based on selection standards, from a first, a second, and a combination of the second and a third correction data which have defective pixel address information and are used to correct outputs from defective pixels of the image sensing element, the first correction data having address information of defective pixels each of which has a signal level larger than a first predetermined level, the second correction data having address information of several defective pixels selected in descending order of signal levels of the defective pixels whose signal levels are respectively larger than a second predetermined level which is smaller than the first predetermined level, and the third correction data having address information of several defective pixels selected in descending order of signal levels of the defective pixels whose signal levels are smaller than a level of the several defective pixels whose address information is included in the second correction data; and performing defective pixel correction processing for an output from the image sensing element by using the selected correction data.

14. A computer readable medium encoded with a pixel correction processing computer program of performing correction for a pixel of an image sensing element formed from a plurality of pixels, comprising:

(A) a step of selecting correction data for use based on selection standards from a first, a second, and a combination of the second and a third correction data which have defective pixel address information and are used to correct outputs from defective pixels of the image sensing element, the first correction data having address information of defective pixels each of which has a signal level larger than a first predetermined level, the second correction data having address information of several defective pixels selected in descending order of signal levels of the defective pixels whose signal levels are respectively larger than a second predetermined level which is smaller than the first predetermined level, and the third correction data having address information of several defective pixels selected in descending order of signal levels of the defective pixels whose signal levels are smaller than a level of the several defective pixels whose address information is included in the second correction data; and (B) a step of performing defective pixel correction processing for an output from the image sensing element by using the selected correction data.

* * * * *